United States Patent [19]

Green

[11] Patent Number: 5,480,749
[45] Date of Patent: Jan. 2, 1996

[54] REVERSIBLE CHIRAL OPTICAL DATA STORAGE USING MAJORITY RULE OF POLYMER CONFORMATION

[76] Inventor: Mark M. Green, 174 W. 76th St., New York, N.Y. 10023

[21] Appl. No.: 313,378

[22] Filed: Sep. 27, 1994

[51] Int. Cl.⁶ .................................. G03C 1/73; G11B 7/00
[52] U.S. Cl. ...................... 430/19; 430/20; 430/269; 430/270.11; 430/495; 430/945; 252/299.01; 528/44; 528/69
[58] Field of Search .............................. 430/19, 20, 270, 430/945, 495, 269; 2252/299.01; 528/44, 69

[56] References Cited

U.S. PATENT DOCUMENTS

| | | | |
|---|---|---|---|
| 4,412,059 | 10/1983 | Krigbaum et al. | 528/192 |
| 5,011,756 | 4/1991 | Nikles | 430/19 |
| 5,262,081 | 11/1993 | Gray et al. | 252/299.01 |

OTHER PUBLICATIONS

Zhang et al., J. Am. Chem. Soc., 116, 4852 (1994).
Zhang et al., J. Phys. Chem., 96, 3063 (1992).
Lemieux et al., J. Org. Chem., 58, 100 (1993).
Lifson et al., Macromolecules, 25, 4142 (1992).
Lifson et al., J. Am. Chem. Soc., 111, 8850 (1989).

*Primary Examiner*—Charles L. Bowers, Jr.
*Assistant Examiner*—John A. McPherson
*Attorney, Agent, or Firm*—William S. Frommer

[57] ABSTRACT

This invention provides a photoswitchable compound comprising interconvertible mirror image units or interconvertible chiral diastereomeric units connected as pendant groups to a stiff polymer having interconvertible left- and right-handed helical portions of its backbone. Further provided by this invention is a photoswitchable compound formed by the method comprising combining an amount of the compound capable of optical activity and capable of changing its optical activity with an amount of a stiff polymer comprised of interconvertible left- and right-handed helical portions. Additionally, this invention provides a method for reversibly storing optical data comprising providing a material comprised of a mixture of a stiff polymer having interconvertible left- and right-handed helical portions and connected units, said units being capable of optical activity and capable of changing its optical activity and irradiating said material with light capable of changing the optical activity of said material.

15 Claims, 3 Drawing Sheets

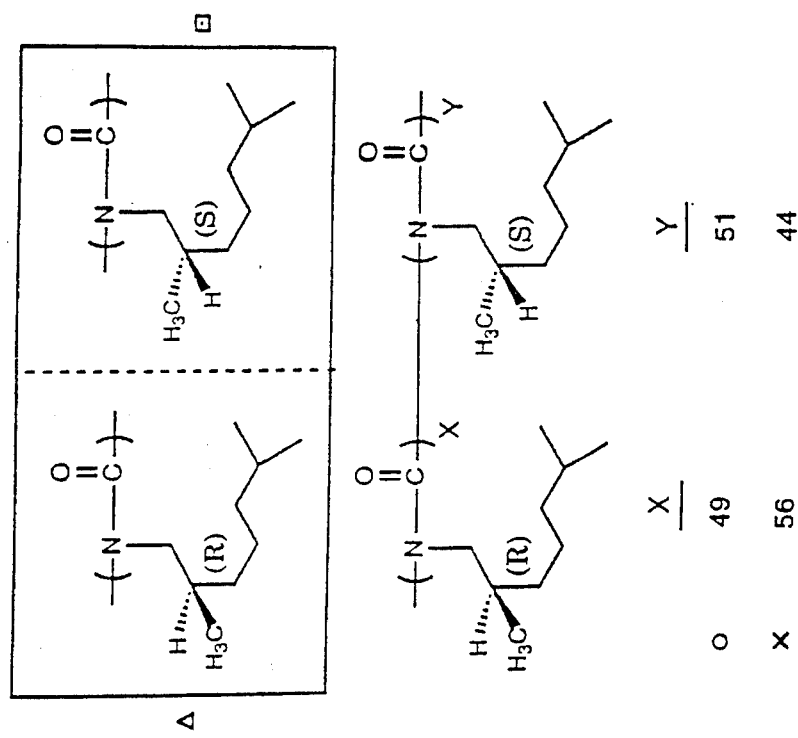
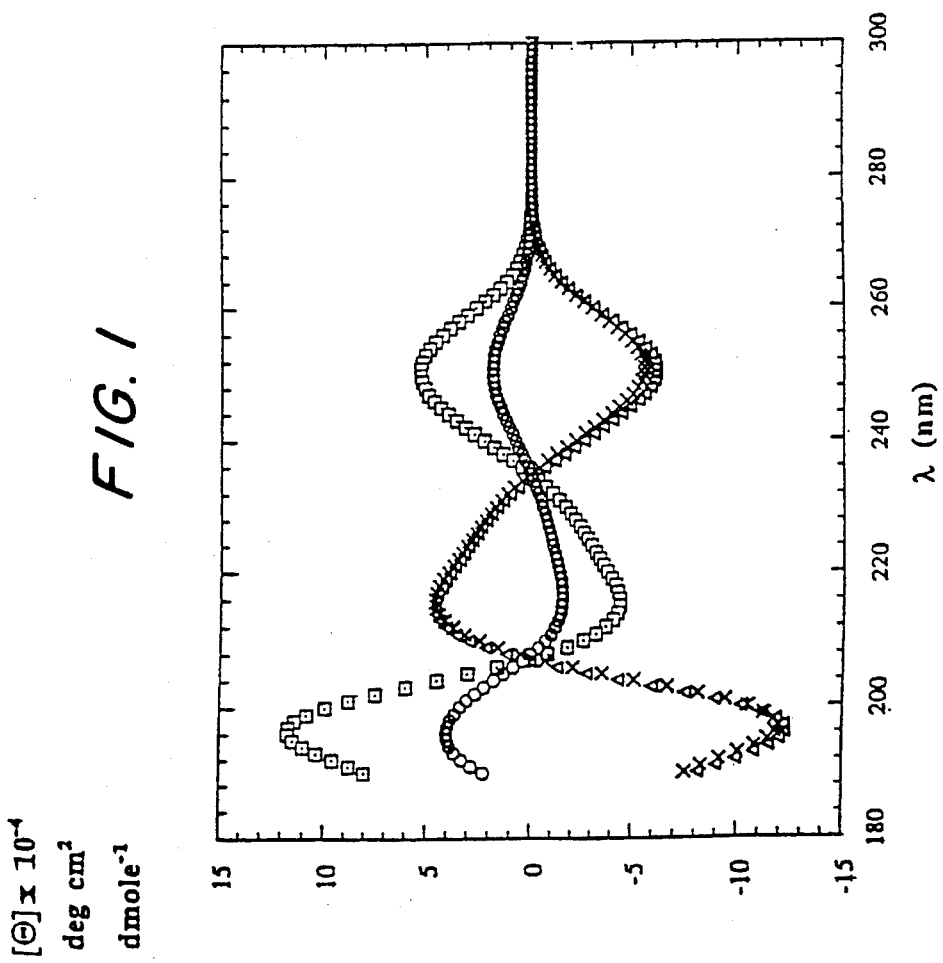
FIG. 1

REVERSIBLE CHIRAL OPTICAL DATA STORAGE USING MAJORITY RULE OF POLYMER CONFORMATION

BACKGROUND OF THE INVENTION

In recent years it has been increasingly important to be able to store and manipulate large amounts of data. Many attempts have been made to develop materials and techniques which would provide means of storing increasing amounts of data with the use of minimal amounts of material. One of the most promising areas in this regard has been digital optical data storage.

Digital optical data storage allows for the recording and processing of information via light. An example of such a data storage device is the compact disc. Thus, developments have provided us with the ability to store information on optical discs. However, this device merely provides the capability of imprinting information or storing information once on the material, which can then be read almost indefinitely.

Although these "write-once" and "read-only" optical discs are available, there remains a need for a truly reversible optical recording media which provides the ability to read, write, erase and then re-record information on the medium. Materials investigated for these purposes have included alloys of rare earth elements and transition metals which allow for combining magnetic and optical recording techniques. Falco, C. M. et al., *Mater. Res. Soc. Symp. Proc.*, Vol. 151; Greidanus, F.J.A.M. et al., *Adv. Mater*, 1:235 (1989). However, organic materials for these purposes have been the increasing focus of research.

Photoreversible compounds, where the reversible switching process is based on photochemically-induced interconversions, play an important role in the search for the ideal optical switch for optical data storage material. Photochromism, which is defined as the reversible change induced by light irradiation between two states of a molecule having different absorption spectra, can be the basis for such a switch. Although the photochromism of a given material or compound may be bistable, such a compound material must also satisfy other requirements to be commercially or practically suitable for the optical storage of data. Thus, it becomes necessary to also find a molecule which will not interconvert between its two states within a large temperature range, so as to allow for stable storage of information. Along these lines, such a material must also be capable of withstanding thermal and photochemical degradation to side products and be resistant to change should it become necessary to use such a material to perform several cycles of writing and erasing.

The two forms of the compound or material should also be easily interconvertible, avoiding the necessity of long irradiation times. Furthermore, each state must be readily detectable.

Attempts to find an organic material suitable for these purposes have thus far fallen short of finding a practical solution. As stated above, many attempts to procure the ideal optical data storage material have been made. These include the use of cis-trans isomerizations, photocyclizations, photochromic keto-enol tautomerism, as well as chirochromic switches. Feringa, B. L. et al. *Tetrahedron*, 49(37):8267–8310 (1993); Zhang, M. et al., *J. Am. Chem. Soc.*, 116:4852–4857 (1994). Again, each of these attempts to solve the problem of truly reversible optical data storage has been met with their own set of problems. For example, photocyclizations have been found to result in undesirable side reactions which interfere with the material's use as an optical data storage material. Furthermore, several of these compounds exhibit low thermal stability. Feringa, B. L. et al., *Tetrahedron*, 49(37):8267–8310 (1993).

One approach to attaining an optical switch has involved the use of photoresolution in which an organic molecule which is capable of existing in two mirror image forms can be switched between these forms by the use of circularly polarized light. In this situation the switch position can be read using polarized light with no change in the readout wavelength since both mirror image forms, i.e. enantiomers, have identical spectra. This approach has been the subject of considerable research effort, combined with efforts to utilize this approach in a liquid crystal. However, the result of this effort has not borne fruit as photoresolveable organic compounds used thus far, have yielded only very small enantiomeric excesses when exposed to circularly polarized light. Even the amplification attained by using these photoresolved compounds as dopants in nematic liquid crystals, causing conversion to cholesteric states, was not adequate to attain an optical switch. This problem has been discussed in Zhang, M. et al., *J. Am. Chem. Soc.*, 116:4852–4857 (1994). As a result efforts have been modified in the direction of searching for light altering changes to chiral diastereomers instead of enantiomers. Even here though the potential for development of an optical switch is limited by the excess of one diastereomer over the other caused by the irradiation.

Accordingly this invention provides a solution to the general problem of the excess of one bistable photoproduced state over the other by attaching the photoswitchable group to a stiff helical polymer which has the inherent characteristic of chiral amplification within its structure with an additional chiral amplification added thereto when the polymer forms or is part of a liquid crystal. Stiff polymers form liquid crystals and are compatible with the director fields of liquid crystals formed from other substances.

BRIEF DESCRIPTION OF THE FIGURES

FIG. 1 shows CD spectral results of a polyisocyanate with a stiff helical structure with chiral pendant groups synthesized from a natural terpene. CD spectra were performed on different samples where the ratio of mirror image forms of the chiral pendant groups was varied.

OBJECTS OF THE INVENTION

Figure 2:
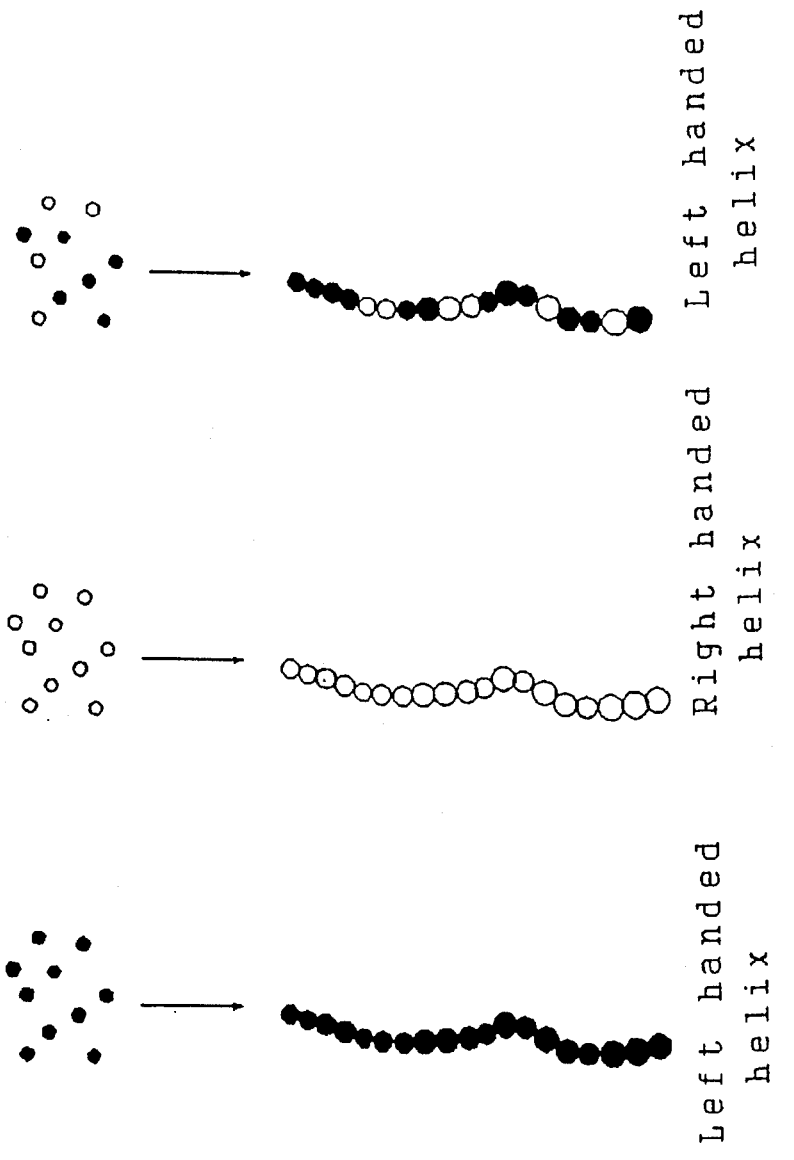
FIG. 2 provides a schematic view of the "Majority Rule" principle.

Thus, an object of this invention is to provide a material for use in truly reversible optical recording, providing the opportunity to read, write, erase and re-record data on said material.

Further objects of this invention will become evident in view of the specification which follows.

SUMMARY OF INVENTION

This invention provides a photoswitchable compound comprising interconvertible mirror image monomer units or interconvertible diastereomeric chiral monomer units connected to a stiff polymer having interconvertible left- and right-handed helical portions of its backbone. As used herein, "diastereomeric chiral units" means units in which diastereomers are interconverted by a configurational change of a chirotopic stereogenic group. For example, using the nomenclature of stereochemistry, where two stereogenic groups are present in the unit, e.g. (R)(R) one can produce (R)(S). Further provided by this invention is a photoswitchable compound formed by the method comprising combining an amount of a compound capable of optical activity and capable of changing its optical activity with an amount of a stiff polymer comprised of interconvertible left- and right-handed helical portions. Additionally, this invention provides a method for reversibly storing optical data comprising providing a material comprised of a mixture of a stiff polymer having interconvertible left- and right-handed helical portions and connected units, said units being capable of optical activity and capable of changing its optical activity and irradiating said material with light capable of changing the optical activity of said material.

DETAILED DESCRIPTION OF THE INVENTION

A compound that is said to be "chirochromic" has two stereogenic chiral moieties. One of these units cannot be changed by impinging irradiation which, however, is capable of causing the other to switch. Chirochromic is an alternative term for the chiral diastereomeric units mentioned above.

A compound which is "photoresolveable" has two mirror image forms which can be interconverted by light in such a way that using circularly polarized light and exciting one preferentially will cause the state to go from racemic to an excess of one of the enantiomers, i.e. the mirror image forms.

A "stiff polymer" is a term familiar in the art, and is used in this context as referring to a specific type of stiff polymer, i.e. a polymer containing helical segments of opposite sense which are interconvertible, but where such reversals in helical sense are few.

This invention provides a photoswitchable compound comprising interconvertible mirror image monomer units or chiral diastereomeric units connected to a stiff polymer having interconvertible left- and right-handed helical portions of its backbone. In one embodiment the photoswitchable compound is in liquid crystalline form. In preferred embodiments of the invention, the stiff polymer is a polyisocyanate. When the stiff polymer is a polyisocyanate, embodiments of this invention also include polymerizable isocyanates as the interconvertible monomer unit. The interconvertible monomer unit is chosen from the group consisting of photoresolveable or chirochromic compounds, Zhang, M. et al., J.Am.Chem.Soc., 116, 4852–4857(1994), where the isocyanate group has been introduced by functional group transformations well known in the art of chemistry.

Also provided by this invention is a photoswitchable compound formed by the method comprising combining an amount of a compound capable of optical activity and capable of changing its optical activity with an amount of a stiff polymer comprised of interconvertible left- and right-handed helical portions. In the preferred embodiment of the invention, the photoswitchable compound is produced by the method further comprising forming a liquid crystal with the photoswitchable compound. In another embodiment of the invention the stiff polymer used in the method to form the photoswitchable compound is a polyisocyanate. In other embodiments of the invention the compound capable of optical activity which is used in the method for forming the photoswitchable compound is selected from the group consisting of photoresolveable or chirochromic compounds.

Furthermore, the compound capable of optical activity in some embodiments may also be capable of being chemically converted into an isocyanate.

Further provided by this invention is a method for reversibly storing optical data providing a material comprised of a mixture of a stiff polymer having interconvertible left- and right-handed helical portions and connected pendant units, said units being capable of optical activity and capable of changing its optical activity and further irradiating said material with light capable of changing the optical activity of said material. In a preferred embodiment of the invention the method further comprises forming a liquid crystal with the photoswitchable compound. In yet another embodiment of the invention, the stiff polymer is a polyisocyanate. Also provided by this invention is a method whereby .reversibly storing optical data wherein the compound capable of optical activity is selected from the group consisting of photoresolvable and chirochromic compounds. In yet other embodiments of the invention, the compound capable of optical activity is also capable of being chemically converted into an isocyanate.

It would be reasonable to expect that mixtures of mirror image isomers will exhibit optical activities in proportion to their enantiomeric excesses. However, as is evident from FIGS. 1, this is not necessarily the case. Given a mixture of mirror image monomers distributed along the length of a stiff polymer, the stiff polymer aids in amplifying the difference in the enantiomeric excess present among the mirror image monomer units according to the "majority rule" principle (see FIG. 2). Each monomer unit exerts pressure on the polymer to alter its helix sense to conform with the direction of the individual monomer. However, as discussed, the energy cost associated with a helical reversal in a stiff polymer is too great. Accordingly, the polymer adopts the conformation of the monomer which is in enantiomeric excess —hence, the "majority rule" principle.

In a random copolymer of units with opposing helix sense preferences, if each monomer were to take its preferred helical sense a helix reversal would be required to follow the numerous microstructural pendant group changes from (R) to (S) and vice versa. Such helix reversals are rarely found to occur at ambient temperatures in a stiff polymer due to the amount of energy required to facilitate such reversals. The cost of fitting the minor enantiomer into the helix sense of the majority enantiomer should be balanced against the helix reversal cost. This random copolymerization means that the backbone conformation is faced with the possibility of changing back and forth between the left and right handed helical senses as the mirror image derived pendant groups are encountered along the chain, incorporating a helix reversal each time, or for the minority mirror image pendant to fit into the helix sense preferred by the majority enantiomer and avoid helix reversals. Since the helix reversals are of higher energy than the energy preference for a mirror image pendant for one helical sense, the low energy state is for the majority to rule, which means the polymer avoids the helix reversals and instead the minor enantiomer fits into the helix sense of the majority enantiomer. Thus it would follow that lower temperatures would enhance the amplification even further since the helix reversal population would be reduced. This temperature effect though would be greatest in long polymer chains which contain reversals in each chain rather than in short chains where only few chains may contain reversals.

If a polymer exists in a stiff helical conformation in which there is no predetermined helical sense, i.e. right or left handed in the absence of chiral pendant units, and if the helical senses are interconvertable in either direction, what results is an amplification property when chiral units are present which causes a nonlinear relationship between enantiomeric or chiral diastereomeric excess and the optical activity properties of the polymer. This amplification arises because any stiff polymer is stiff by virtue of the absence of a substantial number of defects which cause a change in the chain direction. In the helical polymer, such defects would be helix reversals, and their numbers would be few. See Lifson, S., *Marcomolecules* 25:4142 (1992). In other words, there would be many units along the chain of one helical sense before a defect would allow conversion to the other helical sense.

In sufficiently short chains, many chains may not contain a helix reversal. However, the discussion above remains unaffected since in shorter chains the helix sense would simply initiate change from the chain end and the amplification described below would be controlled by the chain length instead by the chain length between helix reversals. Lifson, S. et al., *J. Am. Chem. Soc.*, 111:8850 (1989). In long chains this is the description of a stereoblock copolymer in which the stereoblocks are interconvertible left and right handed helical conformational states. The helix reversals described above must have a relatively high energy compared to the helical states.

If a pendant group consisting of chiral groups of one mirror image form is attached to the stiff polymer the backbone responds by converting one mirror image backbone helical sense to another.

Now consider that the stiff polymer is constructed of pendant groups which are chiral and in equal or near equal proportion but where the chiral groups have the additional property of being photoswitchable either as in photoresolution or as in chirochromism. Examples of such groups/compounds are well known in the art. Specifically, these groups are exemplified in Zhang, M, *J. Am. Chem. Soc.*, 116:4852 (1994), Zhang, M., *J. Phys. Chem.*, 96:3063 (1992), and Lemieux, R. P., *J. Org. Chem.*, 58:100 (1993), incorporated herein by reference. It will be appreciated that these groups may be incorporated into the polymer by functional group transformations which do not change their photoswitchable character, as for example, on conversion of a carboxcyclic acid to an isocyanate. The optical activity property of the chain, which is overwhelmingly dominated at all wavelengths by the helical conformation, would respond out-of-proportion to the effect of the light in switching the chiral sense of the pendant group. In this way even a small excess of one chiral form over the other caused by the light would be amplified as if the excess caused by the light were much greater. This follows from the majority rule principle discussed above. This addresses the problem impeding development of an optical switch based on chirality by amplifying even a negligible excess of one chiral form, produced by the irradiation, to detectable levels.

Excitation of the monomer units, by irradiation, disrupts the rest ratio of the units and this will cause a difference. This difference may be only a minute difference, however, the presence of the stiff polymer will amplify the difference leading to a detectable difference.

Figure 3:
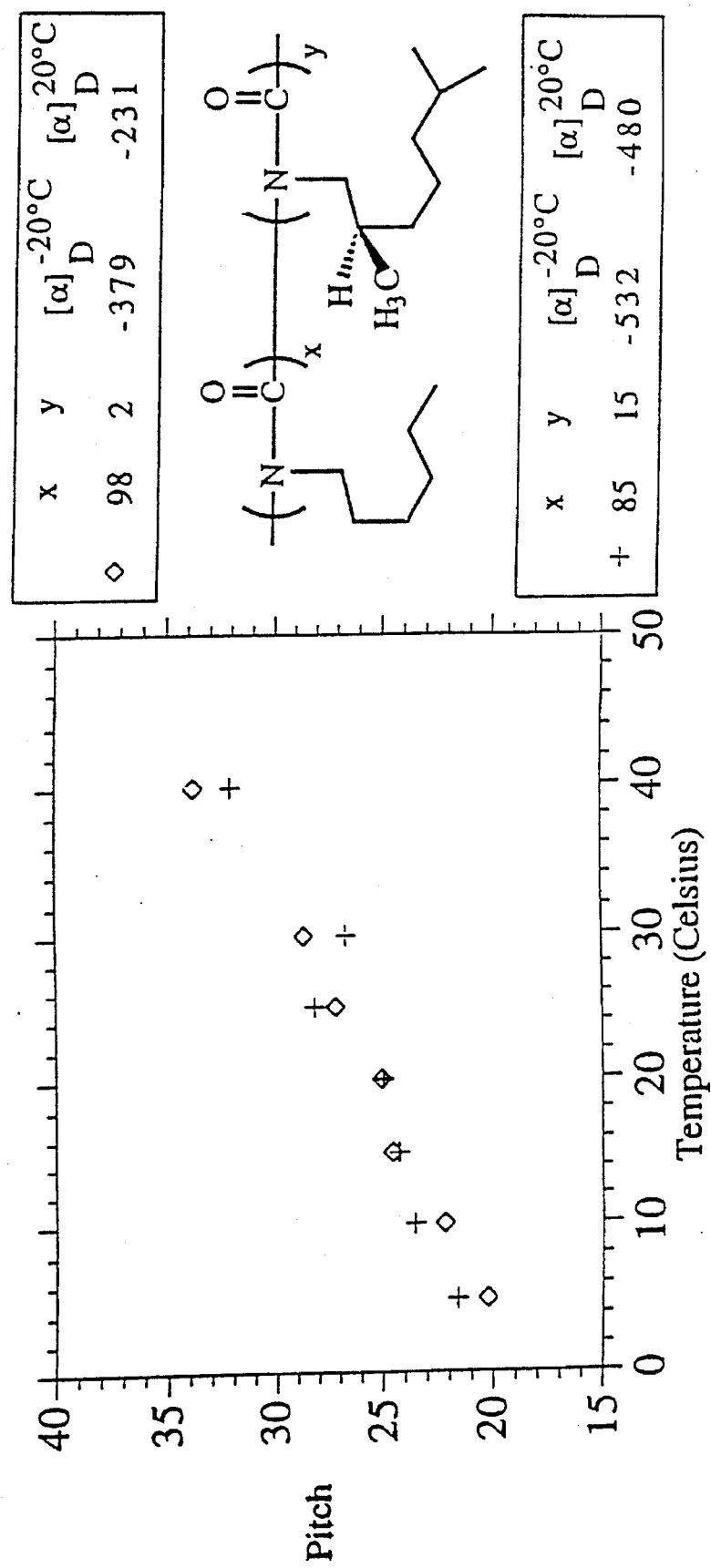
FIG. 3 graphically depicts the results comparing two polyisocyanates with different dilute solution chiral optical properties when used to convert a nematic liquid crystal to a cholesteric liquid crystal as measured by the temperature dependence of the pitch of the cholesteric liquid crystal.

This amplification is magnified even further, as described below, when the stiff polymer is dissolved in a liquid crystal or forms a liquid crystal. It is a characteristic of stiff polymers to form liquid crystals and be compatible with and mix with liquid crystals. In the stiff helical polymer in a liquid crystal, the mobile helix reversals, once present, can be expected to be excluded, and in fact, FIG. 3 shows this to be the case in polyisocyanates. Fewer reversals results in greater amplification since longer stretches of the chain are helix sense controlled by the majority rule discussed above.

This invention is illustrated in the example which follows. The example is set forth to aid in understanding the invention but is not intended to and should not be construed to in anyway limit the scope of the claims.

EXAMPLE 1

Polyisocyanates are characterized by a stiff helical conformation in which long blocks of opposing helical sense regions are separated by rapidly mobile helix reversals which can move along the chain and in various ways change their population and the separation between them. As seen in FIG. 1, helix sense excess is nonlinearly related to the enantiomeric excess of the side chain stereogenic center in spite of the fact that the side chains are the source of the discrimination causing the helix sense excess. This nonlinearity seen in FIG. 1 arises from a cooperativity associated with the energetic difficulty of attaining a helix reversal conformation.

A mass spectrometric analysis, Munoz, B., et al., Polymer Preprints (ACS), 35(2), 809, in which one of the monomer enantiomers described in FIG. 1 was labeled with deuterium was performed. This analysis showed that the enantiomeric comonomer units were randomly copolymerized in the formation of the polymers in FIG. 1.

In a random copolymer constructed of significant proportions of both comonomers very few monomer units of one pendant chiral configuration will follow each other along the chain contour without interruption by the other. Since the (R) and (S) homopolyisocyanates in FIG. 1 are entirely left handed and right handed in their helical conformations respectively, the copolymer would be forced to introduce many helix reversals if the backbone conformation were to follow the dictates of the often changing microstructure. Such reversals in poly(alkyl isocyanates) are associated with an excess energy, over the helical state, of about 4000 calories/mole in n-hexane. The same experiments reveal that the energetic preference for one helical state arising from the interaction of the side chain stereogenic center and the backbone conformation is close to 400 calories/mole in the poly(2,6-dimethyl heptyl isocyanate), i.e. left handed for (R) or vice versa, Lifson, S., et al., Macromolecules, 1992, 25, 4142. Minimizing the free energy demands that the minor enantiomer fits into the preferred helix sense of the majority enantiomer to avoid the incorporation of many energetically costly helix reversals along the backbone. In other words, majority rules in the copolymerization under these cooperative constraints.

As the proportion of mirror image monomer units approaches 50:50 in the embodiment of FIG. 1, the random statistics allow long runs of single configurations allowing therefore equal populations of left and right handed helical blocks, each though likely containing minor populations of the other configuration. The approach to this situation is evident in the CD spectrum of the copolymer constructed of 51% (S) 49% (R) shown in FIG. 1 where the CD intensity has decreased.

A polyisocyanate with stiff polymer characteristics was prepared with chiral groups synthesized from a natural terpene, attached to its backbone. This provided the opportunity to vary the enantiomeric excess of the monomer units which form these pendants attached to the backbone. As seen in FIG. 1, when the pendants were all of one mirror image form the optical activity property as shown by the circular dichroism (CD) spectra were equal and opposite in sign. When the pendant groups are mixed with 56% of one type of mirror image and 44% of the other, the optical activity property was identical to that for the polymer constructed entirely of one mirror image form. Even with 51% of one and 49% of the other the optical activity property was still very high compared to that expected proportionate to the enantiomeric excess of the pendant groups. The phenomenon demonstrated here and illustrated by FIG. 1, is not limited to chiral optical effects of a particular kind. Thus, although circularly polarized light was utilized in this experiment, similar experiments have been run with exactly analogous results using plane polarized light in the visible wavelength region.

Although the pendant groups in FIG. 1 are not photoswitchable the incorporation of such photoswitchable chiral pendant groups in place of those in FIG. 1 will make no difference to the majority rule principle which is solely associated with the backbone properties and the energetic relationship between the helix reversals and the energy preference of the chiral pendant group for one helical sense. It is a well known characteristic of the polyisocyanate, Lifson, S. et al., Macromolecules, 1992, 25, 4142 and references therein, that a wide range of chiral groups affect the helix sense with an energetic preference which is appropriate, as explained in detail above, to expect majority rule. The range of this phenomenon of the preference for one helical sense by chiral pendant groups or even chiral solvents is seen in the polyisocyanates in: Green, M. M., et al., J.Am.Chem.Soc., 1993, 115, 4941–4942; Green, M. M., et al., J.Am.Chem.Soc., 1989, 111, 6452–6454; Green, M. M., et al., 1988, 110, 4063–4065. Therefore the pendant group in FIG. 1 can be taken as an example or model of any chiral group including those which are photoswitchable as of the type found in: Zhang, M., et al., J.Am.Chem.Soc., 116, 4852 (1994); Zhang, M., et al., J. Phys. Chem., 96, 3063 (1992); Lemieux, R. P., et al., J.Org.Chem., 58, 100 (1993). As long as the essential energetic relationship is met in which the excess energy of the helix reversal is large compared to the energetic bias of the chiral pendant favoring one helical sense of the backbone, majority rule will be in force and the kind of amplification seen in FIG. 1 will take place. This invention therefore allows a wide range of chiral pendant groups to be used as the optical switch as long as the photoswitchable group is capable of being attached as pendant to the stiff helical polymer. This attachment involves chemical procedures which are well known to those skilled in the art of chemistry. Moreover, the stiff helical polymer with few energetically costly helix reversals may have any structure as long as the helix sense of the backbone is not predetermined. The polyisocyanate is therefore a model for a variety of such polymers which are appropriate for the optical switch as described above. One example of a polymer which may fit the necessary structural feature is described in Goodwin, A. et al., Macromolecules, 27, 5520 (1994). In accordance with this invention an important feature of the stiff polymer is that it have a helical backbone conformation with equal probability of left and right handed helical senses with helix reversals which are few and which have the property of movement along the chain backbone. The chiral photoswitchable groups should be made pendant to such a polymer and the energy cost of the helix reversal should be high compared to the energy bias favoring one helical sense by the pendant group. These conditions are met, with the exception of the ability to photoswitch, by the materials of FIG. 1.

EXAMPLE 2

The mobile helix reversals in the backbone of the stiff polymers described above would be expected to be excluded in a liquid crystal state because of the kinked angle they cause. Khokhlov, A. R., et al., *Macromolecules*, 17:2678 (1984). FIG. 3 shows a demonstration of this effect directly applicable to the optical switch. In FIG. 3 it is seen that two polyisocyanates with different chiral optical properties in dilute solution are identical in their effect on the conversion of a nematic liquid crystal to a cholesteric liquid crystal as measured by the temperature dependence of the pitch of the cholesteric liquid crystal. Without being bound by any particular theory, this phenomenon can be reasonably explained by the exclusion of the helix reversals in these chains. In the two polymers shown in FIG. 3, the dilute solution optical activities measured the ratio of the right and left handed helical sense blocks which are separated by helix reversals. Exclusion of the helix reversals in the two polyisocyanates shown in FIG. 3 results in the formation of a single helical sense, i.e. a complete preference for the chiral comonomer which is not possible in dilute solution for these particular copolymers as first described in Green, M. M., et al., *J. Am. Chem. Soc.*, 111:6452(1989).

In FIG. 1 it is seen that although the 56/44 ratio does give the same optical activity properties as the polymer made from one mirror image monomer, the 51/49 does not show the full optical activity. This arises because when the ratio comes close to 50/50 there can be regions of the chain in which the formally minority enantiomeric pendant group is locally in excess therefore controlling the local helix sense. In the absence of reversals (as is the case in liquid crystals as demonstrated in FIG. 3) this type of local control is not possible since the entire chain must take on one helical sense and even a negligible excess of one chiral form can control the entire chain. The use of liquid crystals to enhance the amplification can arise by dissolving the stiff polymer with the appropriate pendant groups in a liquid crystal which could be affected by chirality, e.g. a nematic state, or by forming the liquid crystal state directly from the stiff polymer via lyotropic or thermotropic methods, i.e. by dissolving the polymer or by melting the polymer or even by forming the kind of liquid crystal aggregates described by Green, M. M. et al., Macromolecules, 1993, 26 4723–4725.

CONCLUSION

The amplification of enantiomeric excess seen above in the polyisocyanates in combination with the known extreme sensitivity of the helix sense to side chain chirality of wide structural variability presents a solution to a previously insurmountable sensitivity problem in using photoresolution for the development of an optical switch since the small enantiomeric excesses normally produced in these experiments are now greatly amplified by incorporation of the photoresolveable moieties as pendant groups in the polyisocyanate or any other stiff helical polymer with parallel conformational properties.

What is claimed is:

1. A photoswitchable compound comprising interconvertible mirror image units or chiral diastereomeric units connected as pendants to a stiff polymer having interconvertible left- and right-handed helical portions of its backbone.

2. The photoswitchable compound of claim 1, wherein the compound is in liquid crystalline form.

3. The photoswitchable compound of claim 1, wherein the stiff polymer is a polyisocyanate.

4. The photoswitchable compound of claim 1, wherein the interconvertible mirror image units are capable of being chemically converted into an isocyanate.

5. The photoswitchable compound of claim 2, wherein the interconvertible mirror image units are capable of being chemically converted into an isocyanate.

6. A photoswitchable compound formed by a method comprising combining an amount of a compound capable of optical activity and capable of changing its optical activity with an amount of a stiff polymer comprised of interconvertible left- and right-handed helical portions.

7. The photoswitchable compound of claim 6, wherein the method further comprises forming a liquid crystal with the photoswitchable compound.

8. The photoswitchable compound of claim 6, wherein the stiff polymer is a polyisocyanate.

9. The photoswitchable compound of claim 6, wherein the compound capable of optical activity is selected from the group consisting of photoresolvable and chirochromic compounds.

10. The photoswitchable compound of claim 8, wherein the compound capable of optical activity is also capable of being chemically converted into an isocyanate.

11. A method for reversibly storing optical data comprising providing a material comprised of a mixture of a stiff polymer having interconvertible left- and right-handed helical portions and connected units, said units being capable of optical activity and capable of changing its optical activity and irradiating said material with light capable of changing the optical activity of said material.

12. The method of claim 11, further comprising forming a liquid crystal with the material.

13. The method of claim 11, wherein the stiff polymer is a polyisocyanate.

14. The method of claim 11, wherein the compound capable of optical activity is selected from the group consisting of photoresolvable and chirochromic compounds.

15. The method of claim 13, wherein the compound capable of optical activity is also capable of being chemically converted into an isocyanate.

* * * * *